United States Patent
Irie

[19]

[11] Patent Number: 6,128,511
[45] Date of Patent: Oct. 3, 2000

[54] CARD-EQUIPPED PORTABLE TELEPHONE WITH A SECURITY FEATURE

[75] Inventor: Makoto Irie, Saitama, Japan

[73] Assignee: NEC Corporation, Tokyo, Japan

[21] Appl. No.: 08/901,242

[22] Filed: Jul. 25, 1997

[30]  Foreign Application Priority Data

Jul. 31, 1996 [JP] Japan .................................. 8-202605

[51] Int. Cl.⁷ ................................................ H04M 1/00
[52] U.S. Cl. .......................... 455/558; 455/410; 455/574
[58] Field of Search .................................. 455/575, 411, 455/410, 566, 551, 558, 571, 572, 573, 574

[56]  References Cited

U.S. PATENT DOCUMENTS

| | | |
|---|---|---|
| 5,384,834 | 1/1995 | Sato et al. . |
| 5,404,580 | 4/1995 | Simpson et al. ........................... 455/89 |
| 5,418,837 | 5/1995 | Johnsson et al. ......................... 379/58 |
| 5,444,764 | 8/1995 | Galecki .................................... 455/558 |
| 5,446,796 | 8/1995 | Ishiguro et al. .......................... 380/25 |
| 5,448,045 | 9/1995 | Clark ....................................... 235/382 |
| 5,565,857 | 10/1996 | Lee ..................................... 350/825.34 |
| 5,657,373 | 8/1997 | Hermansson et al. ................... 455/551 |
| 5,909,652 | 6/1999 | Ishikawa et al. ........................ 455/558 |
| 5,913,175 | 6/1999 | Pinault .................................... 455/558 |
| 5,915,226 | 6/1999 | Martineau ............................... 455/558 |
| 5,933,773 | 8/1999 | Barvesten ............................... 455/411 |
| 5,933,785 | 8/1999 | Tayloe .................................... 455/558 |
| 5,987,325 | 5/1999 | Tayloe .................................... 455/558 |

FOREIGN PATENT DOCUMENTS

| | | |
|---|---|---|
| 276403A | 8/1988 | European Pat. Off. . |
| 0 639 486 | 2/1995 | European Pat. Off. . |
| 2-123482 | 5/1990 | Japan . |
| 3-76364 | 4/1991 | Japan . |
| 3-268050 | 11/1991 | Japan . |
| 4-14916 | 1/1992 | Japan . |
| 6-282691 | 10/1994 | Japan . |
| 7-203083 | 8/1995 | Japan . |

*Primary Examiner*—Edward F. Urban
*Assistant Examiner*—Tilahun Gesesse
*Attorney, Agent, or Firm*—Sughrue, Mion, Zinn, Macpeak & Seas, PLLC

[57]  ABSTRACT

A portable telephone set includes a card, a portable telephone set body, a card insertion detecting circuit, and a control section. The card has a ROM in which the identification information and password of a subscriber are stored in advance. The portable telephone set body has at least a radio section for transmitting/receiving a radio signal, and is used to perform originating and terminating operations. The card insertion detecting circuit detects insertion of the card in the portable telephone set body. The control section sets the portable telephone set body in a password input wait state when insertion of the card is detected by the card insertion detecting circuit and the power supply of the portable telephone set is turned on while the card is inserted therein, and sets the portable telephone set body in a wait state allowing originating and terminating operations only when a correct password is input in the password input wait state.

18 Claims, 7 Drawing Sheets

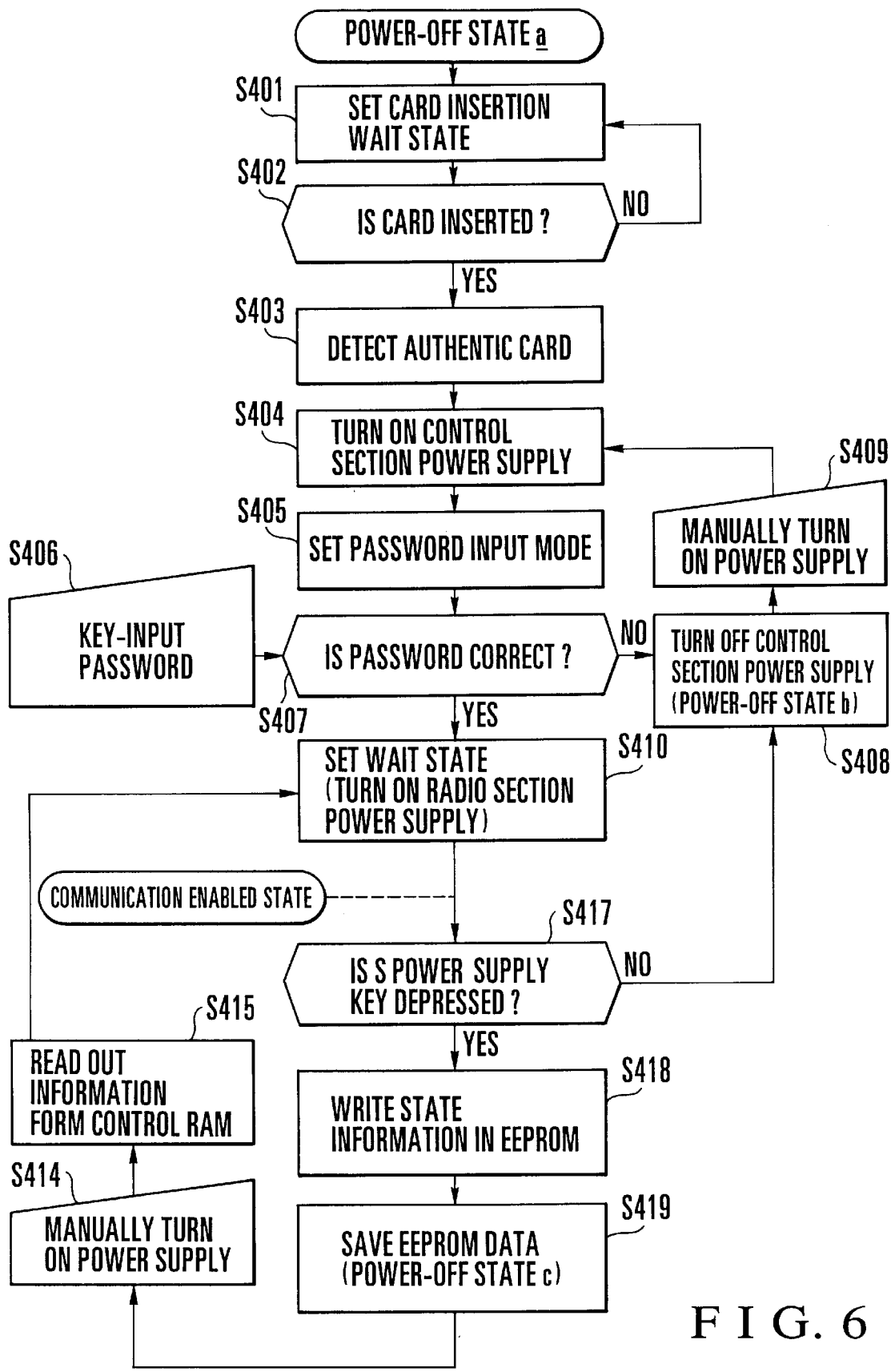
F I G. 6

CARD-EQUIPPED PORTABLE TELEPHONE WITH A SECURITY FEATURE

BACKGROUND OF THE INVENTION

The present invention relates to a card-equipped portable telephone set with excellent security which is set in a usable state when a user inputs a password, and allows easy management.

A card unit is added to a conventional card-equipped portable telephone set of this type to add various functions to a portable telephone set equipped with no card.

Japanese Patent Laid-Open No. 3-76364 discloses a technique of changing the function settings of the push keys by using various types of IC cards (a sales management card, a telephone directory card, individual customer cards, and the like) prepared in accordance with functions. According to this technique, a compact portable telephone set can be effectively used by using different IC cards in accordance with application purposes.

Japanese Patent Laid-Open No. 4-14916 discloses a portable telephone set which serves as a receive-only telephone set when no card is inserted, but allows an originating operation when a card is inserted. According to this portable telephone set, a destination telephone number is input through a ten-keypad prepared on the card, and the card in which the destination telephone number is input is inserted into the portable telephone set, thereby allowing an originating operation. Even if, therefore, the portable telephone set is lost or stolen, no originating call can be illegally generated unless the card is inserted in the telephone set.

As described above, a conventional card-equipped portable telephone set incorporates all the essential functions of the portable telephone set, and cards are used to add additional functions. That is, even if no card is inserted in the portable telephone set, since identification information and the like are stored in the main body of the telephone set, it can be used as a portable telephone set even though some restrictions are imposed thereon.

In addition, when, for example, a new portable telephone set is bought to replace the old one, the telephone number must be changed. This problem is common to portable telephone sets equipped with no cards. Furthermore, when a portable telephone set is lost, a finder can easily and illegally use it. As a result, the owner of the lost telephone set is charged. That is, a problem is posed in terms of security. Moreover, there is a shortage of physical circuit numbers on the portable telephone business side.

SUMMARY OF THE INVENTION

It is an object of the present invention to provide a portable telephone set which requires no change in telephone number even if a new portable telephone set is bought to replace the old one, and can solve the problem of a shortage of physical circuits on the portable telephone business side.

It is another object of the present invention to provide a portable telephone set which is set in a usable state when a user inputs a password, thereby providing excellent security.

In order to achieve the above objects, according to the present invention, there is provided a portable telephone set comprising a card having a first memory in which identification information and a password of a subscriber are stored in advance, a portable telephone set body having at least radio means for transmitting/receiving a radio signal, and adapted to perform originating and terminating operations, card insertion detecting means for detecting insertion of the card in the portable telephone set body, and control means for setting the portable telephone set body in a password input wait state when insertion of the card is detected by the card insertion detecting means and a power supply of the portable telephone set is turned on while the card is inserted therein, and for setting the portable telephone set body in a wait state allowing originating and terminating operations only when a correct password is input in the password input wait state.

BRIEF DESCRIPTION OF THE DRAWINGS

FIG. 6 is a flow chart showing the operation of the fourth embodiment of the portable telephone set of the present invention.

DESCRIPTION OF THE PREFERRED EMBODIMENTS

The present invention will be described in detail below with reference to the accompanying drawings.

Figure 1:
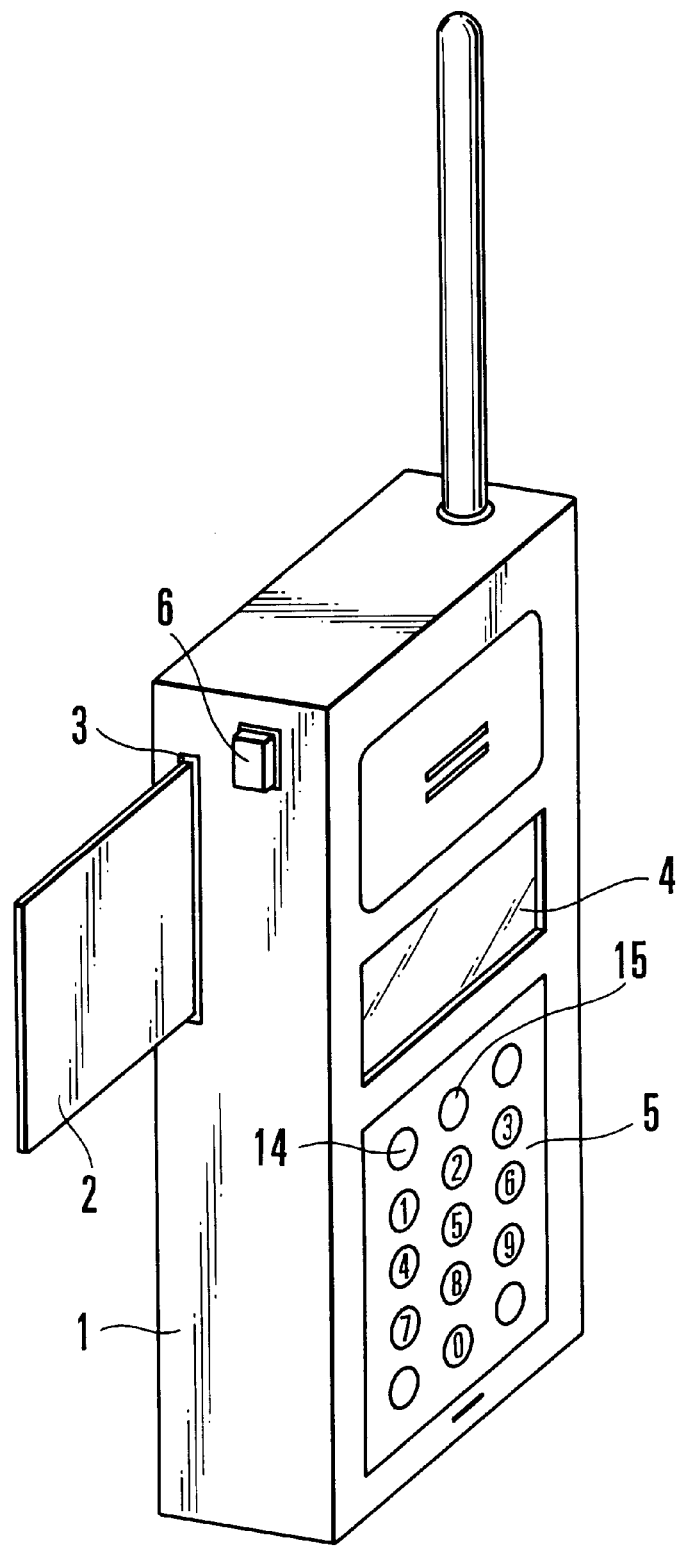
FIG. 1 is a perspective view of a portable telephone set according to the present invention.

FIG. 1 shows a portable telephone set according to the present invention. Referring to FIG. 1, reference numeral 1 denotes a portable telephone set body; and 2, an individual information card (to be referred to as a card hereinafter) incorporating a storage unit in which identification information and a password are stored in advance. The card 2 is inserted in a card slot 3 when the portable telephone set body 1 is used. The card slot 3 has a reception connector. (not shown) for electrical connection to the card 2. Reference numeral 4 denotes a display section for displaying an input telephone number and the like; 5, an input keypad which is used by the user to input a telephone number and the like; 6, an ejection button for removing the card 2 from the portable telephone set body 1; 14, a first power supply key of the portable telephone set body 1; and 15, a second S power supply key of the portable telephone set body 1.

Figure 2:
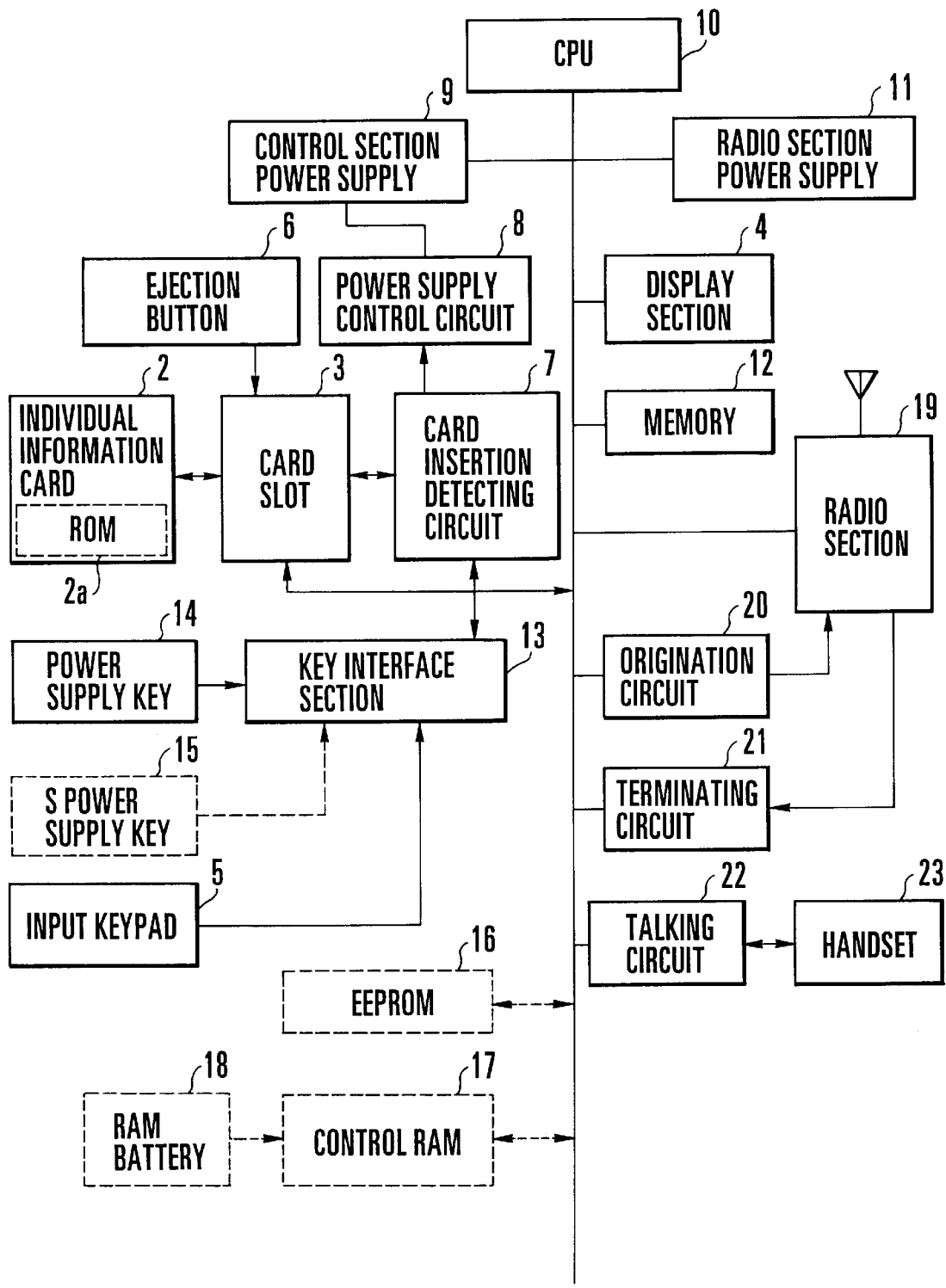
FIG. 2 is a block diagram showing the circuit arrangement of the portable telephone set in FIG. 1.

FIG. 2 shows the circuit arrangement of the portable telephone set in FIG. 1. Referring to FIG. 2, reference numeral 7 denotes a card insertion detecting circuit for detecting insertion of the card 2 having a ROM 2a; 8, a power supply control circuit for ON/OFF-controlling a control section power supply 9 in accordance with the detection output from the card insertion detecting circuit 7; 10, a CPU (Central Processing Unit) for controlling the overall portable telephone set; 11, a radio section power supply for supplying power to a radio section 19, an originating circuit 20, a terminating circuit 21, a talking circuit 22, and the like; 12, a memory which stores control programs for the CPU 10 and to which power is supplied from the control section power supply 9; 13, an EEPROM (Electrically Erasable and Programmable Read Only Memory) used by the CPU 10 to store information obtained during a process when the power supply is turned off by the first power supply key 14; 17, a control RAM (Random Access Memory) used by the CPU 10 to store information obtained during a process when the power supply is turned off by the second S power supply key 15; 18, a control RAM battery for supplying power to the control RAM 17; and 23, a handset connected to the talking circuit 22.

The information stored in the card 2 will be described next. Identification information and a password are recorded as pieces of individual information on the ROM 2a incorporated in the card 2. A terminal (not shown) is formed on the card 2 to exchange signals with the portable telephone set. The above identification information includes a subscriber number length, a subscriber number (MSN), an MSK-key, a mobile station number length, a mobile station number (MSI), an MSI-key, a mobile station classification, a home perch channel number, a roaming destination 1 perch channel number, a roaming destination 2 perch channel number, an operator intrinsic area, home network information, roaming destination network 1 information, roaming destination network 2 information, and roaming mode information. These pieces of information are written in the card 2 in the shop.

The first to fifth embodiments each having the above arrangement will be described below with reference to the flow charts of FIGS. 3 to 7. In the description of these embodiments, the portable telephone set body 1 is set in three types of power-off states, i.e., power-off state a, power-off state b, and power-off state c. In power-off state a, the power supply is in the OFF state while the card 2 is not inserted in the portable telephone set body 1. In power-off state b, the power supply is in the OFF state while the card 2 is inserted in the portable telephone set body 1 and no password information is stored in the EEPROM 16 and the RAM 17. When the power supply in this state is turned on, the password must be input. In power-off state c, the power supply is in the OFF state while the card 2 is inserted in the portable telephone set body 1 and the password information is stored in the EEPROM 16 or the RAM 17. When the power supply in this state is turned on, the wait state can be immediately set without inputting the password.

Figure 3:
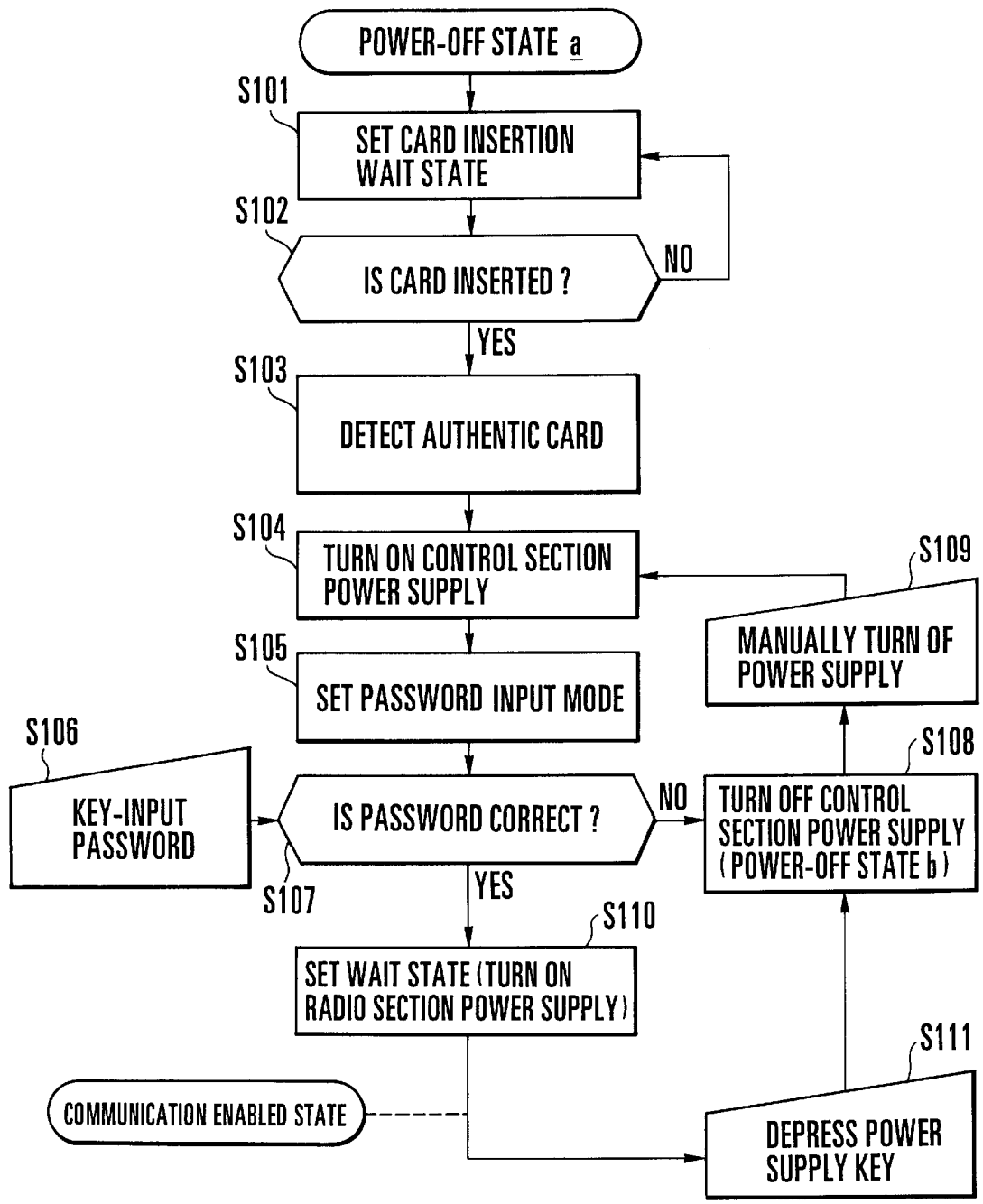
FIG. 3 is a flow chart showing the operation of the first embodiment of the portable telephone set of the present invention.

The operation of the first embodiment will be described next with reference to FIG. 3. Referring to FIG. 3, in step S101, the portable telephone set is set in the wait state to wait for insertion of the card 2 in power-off state a. In step S102, it is checked whether the card 2 is inserted in the card slot 3. If YES in step S102, the flow advances to step S103. If NO in step S102, the flow returns to step S101. When the card 2 is inserted, the card insertion detecting circuit 7 determines insertion of the authentic card 2. In step S104, the power supply control circuit 8 turns on the control section power supply 9. When the control section power supply 9 is turned on, the CPU 10 starts operating. The CPU 10 loads the control programs stored in the memory 12. The flow then advances to step S105 to set a password input mode. At this time, the display section 4 is set in a password display mode.

When the user inputs a password through the input keypad 5 in step S106, the CPU 10 checks in step S107 whether the password stored in the ROM 2a coincides with the input password. If YES in step S107, the flow advances to step S110. If NO in step S107, the flow advances to step S108. When the flow advances to step S108, the control section power supply 9 is turned off to set power-off state b.

When the user turns on the power supply by depressing the first power supply key 14 in step S109 while the card 2 is inserted, the flow returns to step S104. When the flow advances to step S110, and the radio section power supply 11 is turned on, the wait state for communication is set through a normal procedure in the portable telephone set.

In the first embodiment, when the user depresses the first power supply key 14 in the step S111, power-off state b is set in step S108. According to the first embodiment, therefore, the portable telephone set cannot be used unless the password is input when the card 2 is inserted and when the power supply is turned on. With this operation, security can be ensured.

Figure 4:
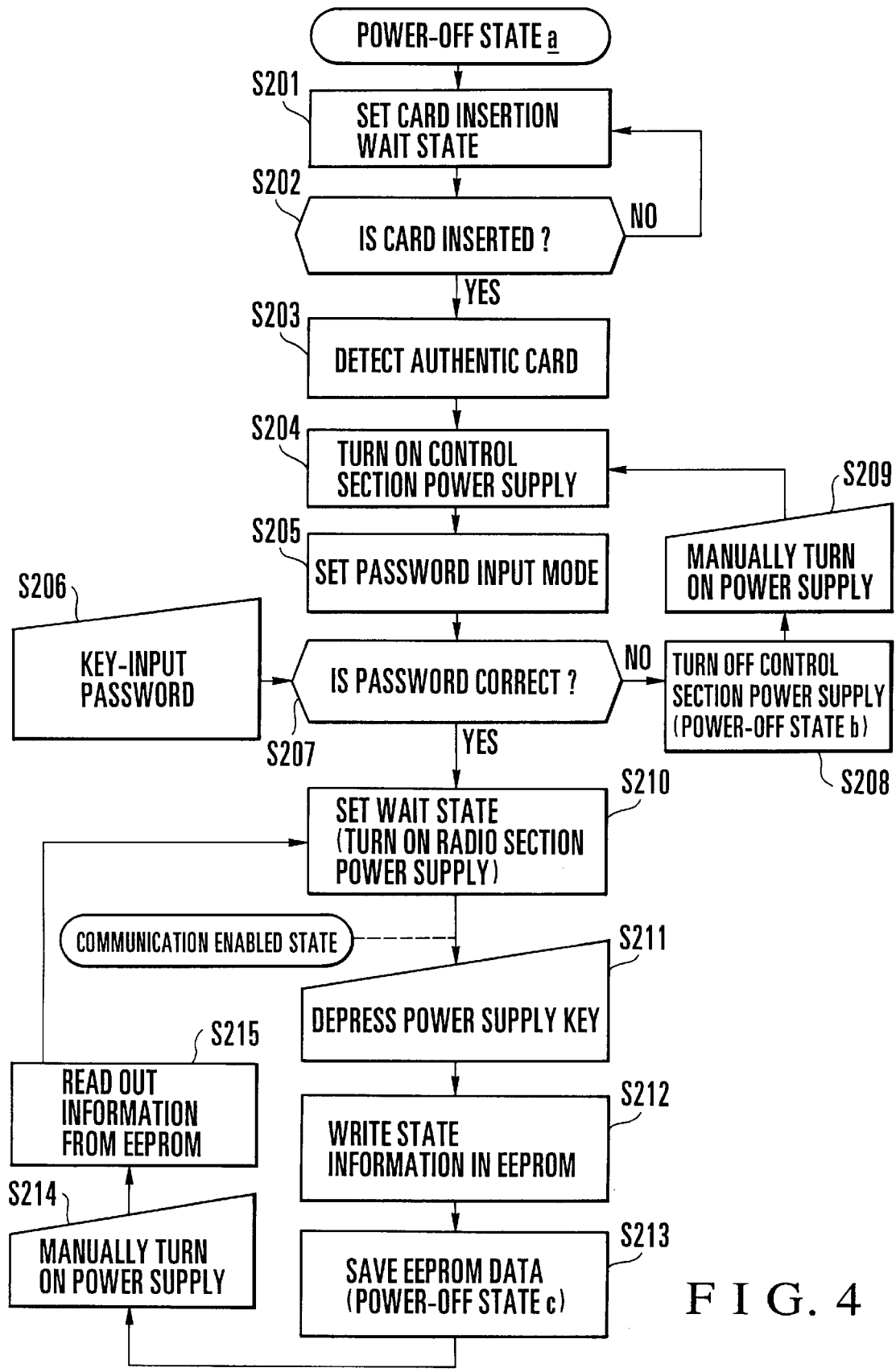
FIG. 4 is a flow chart showing the operation of the second embodiment of the portable telephone set of the present invention.

The operation of the second embodiment will be described next with reference to FIG. 4. Note that since steps S201 to S210 are the same as steps S101 to S110, a description thereof will be omitted. Referring to FIG. 4, when the user depresses the first power supply key 14 in step S211, the CPU 10 saves the information obtained up to step S207 in the EEPROM 16 in step S212. In step S213, power-off state c is set, in which the process information is saved in the EEPROM 16 in step S213. When the user depresses the first power supply key 14 in step S214 while the card 2 is inserted, the CPU 10 reads out the information saved in the EEPROM 16 in step S215, and returns to the wait state in step S210.

According to the second embodiment, the portable telephone set cannot be used unless the password is input when the card 2 is inserted. Once the input password coincides with the stored password, the portable telephone set can be used without inputting the password again when the power supply is turned on again as long as the card 2 is inserted in the telephone set.

Figure 5:
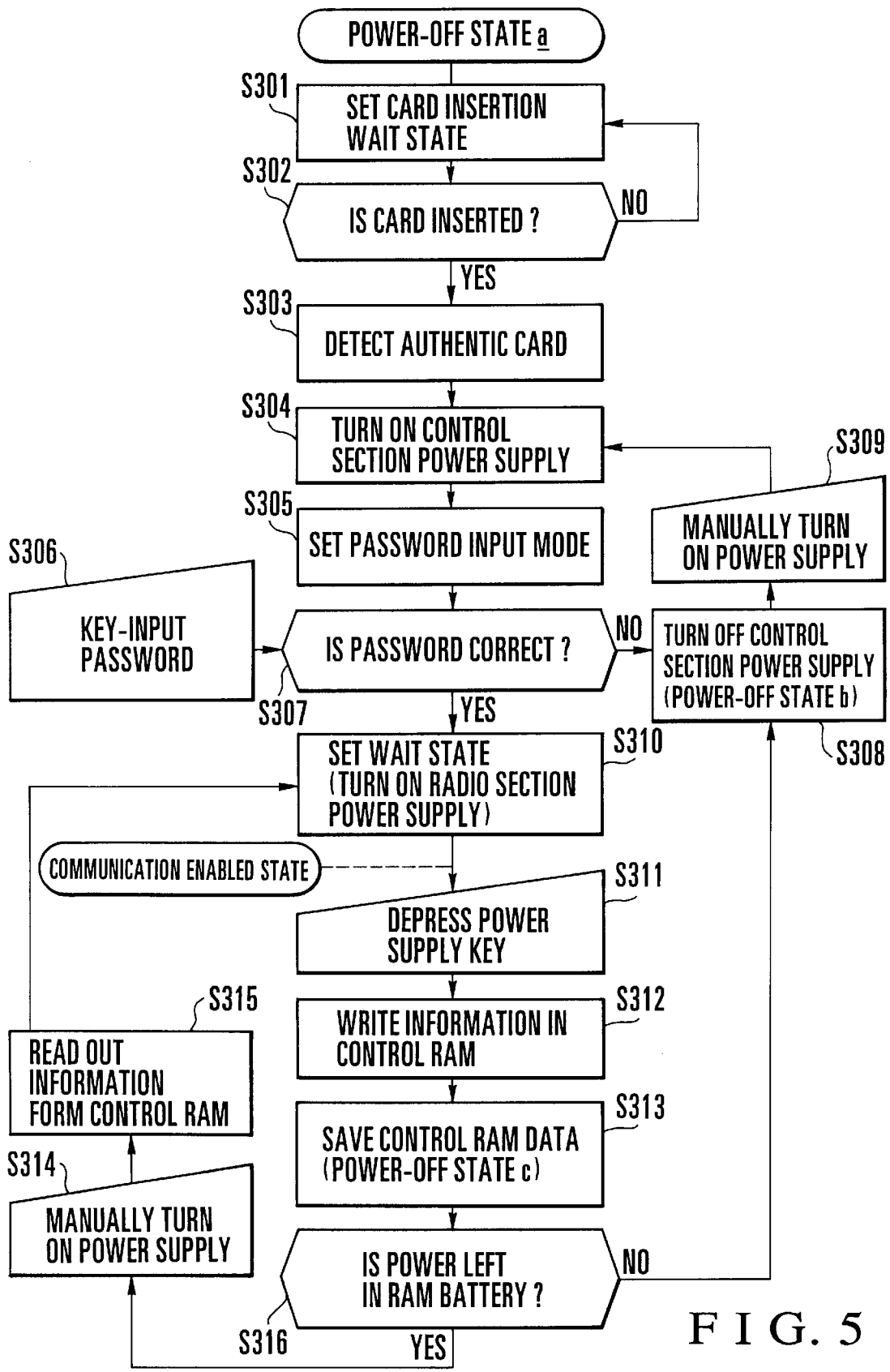
FIG. 5 is a flow chart showing the operation of the third embodiment of the portable telephone set of the present invention.

The operation of the third embodiment will be described next with reference to FIG. 5. Note that since steps S301 to S310 are the same as steps S101 to S110 in FIG. 3, a description thereof will be omitted. Referring to FIG. 5, when the user depresses the first power supply key 14 in step S311, the information obtained up to step S307 is saved in the control RAM 17 in step S312. In step S313, power-off state c is set, in which the process information is stored in the RAM 17. If it is determined in step S316 that a predetermined period of time has not elapsed since the power supply was turned off, for example, power is left in the control RAM battery 18, the flow advances to step S314. When the user depresses the first power supply key 14 in step S314, the CPU 10 reads out the information saved in the RAM 17 in step S315. Thereafter, the wait state in step S310 is set. If it is determined in step S316 that the predetermined period of time has elapsed, for example, no power is left in the control RAM battery 18, all the information in the control RAM 17 is lost, and the current state is switched to power-off state b in step S308.

According to the third embodiment, the portable telephone set can be used by inputting the password when the card 2 is inserted. The portable telephone set can be used without inputting the password again when the power supply is turned on again within a predetermined period of time after the power supply is turned on. However, when the power supply is turned on again after the predetermined period of time, the portable telephone set cannot be used without inputting the password again. In this embodiment, a lapse of the predetermined period of time is determined on the basis of the remaining power of the control RAM battery 18. However, the predetermined period of time may be counted by a timer circuit. Alternatively, a lapse of the predetermined period of time and the remaining power in the control RAM battery 18 may be separately checked in a time-serial manner.

The operation of the fourth embodiment will be described next with reference to FIG. 6. Note that since steps S401 to S410 are the same as steps S101 to S110 in FIG. 3, a description thereof will be omitted. Referring to FIG. 6, in step S417, the user depresses the first power supply key 14 or the second S power supply key 15 to turn off the power supply. If the user depresses the first power supply key 14, power-off state b in step S408 is set as in the case of determination of password incoincidence in step S408. If the user depresses the second S power supply key 15 in step S417, the information obtained up to step S407 is saved in the EEPROM 16 in step S418. In step S419, power-off state c is set. Thereafter, when the user depresses the first power supply key 14 to turn on the power supply in step S414, the information saved in the EEPROM 16 is loaded in step S415, and the wait state in step S410 is set, thereby immediately allowing communication.

According to the fourth embodiment, the portable telephone set cannot be used unless the password is input when the card 2 is inserted and when the power supply is turned on again after the first power supply key 14 is depressed to turn off the power supply. In contrast to this, when the power supply is turned on again after the second S power supply key 15 is depressed to turn off the power supply, the portable telephone set can be used without inputting the password.

Figure 7:
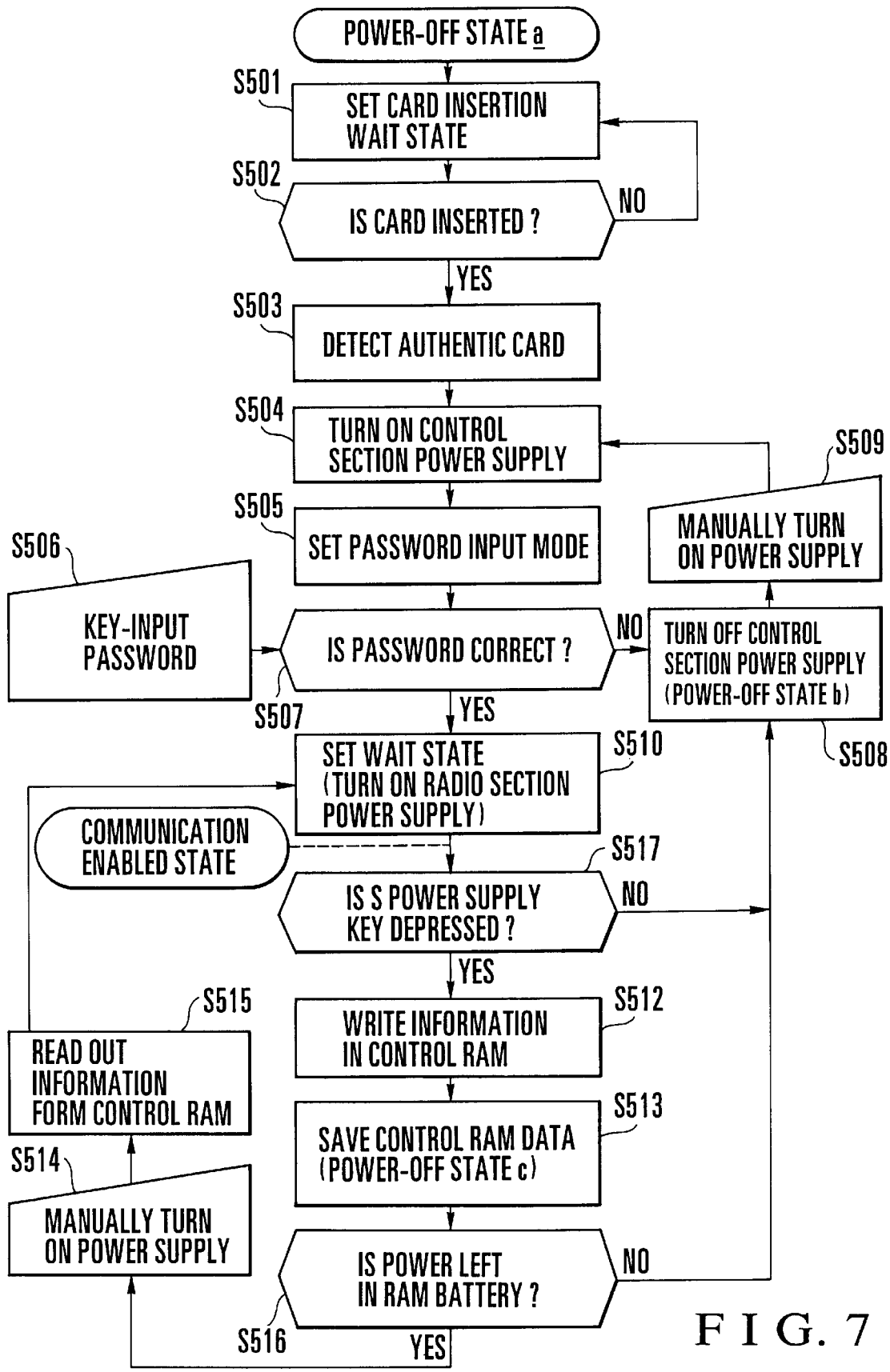
FIG. 7 is a flow chart showing the operation of the fifth embodiment of the portable telephone set of the present invention.

The operation of the fifth embodiment will be described next with reference to FIG. 7. Note that since steps S501 to S510 are the same as steps S101 to S110 in FIG. 3, a description thereof will be omitted. Referring to FIG. 7, in step S517, the user depresses the first power supply key 14 or the second S power supply key 15 to turn off the power supply. If the user depresses the first power supply key 14, power-off state b in step S508 is set as in the case of determination of password incoincidence in step S507. If the user depresses the second S power supply key 15 in step S517, the information obtained up to step S507 is saved in the control RAM 17 in step S512, and power-off state c is set in step S513. If it is determined in step S516 that no power is left in the control RAM battery 18, all the information in the control RAM 17 is lost, and the current state is switched to power-off state b in step S508. If it is determined that power is left, the flow advances to step S514. When the user depresses the first power supply key 14, the contents of the control RAM are read out in step S515, and the wait state in step S510 is set, thereby immediately allowing communication.

According to the fifth embodiment, the portable telephone set cannot be used unless the password is input when the card 2 is inserted and when the power supply is turned on again after the first power supply key 14 is depressed to turn off the power supply. If the power supply is turned on again within a predetermined period of time after the power supply is turned off by depressing the second S power supply key 15, the portable telephone set can be used without inputting the password again. After the predetermined period of time elapses, the portable telephone set can be used by inputting the password.

In each embodiment described above, the EEPROM 16, the control RAM 17, and the control RAM battery 18 are incorporated in the portable telephone set body 1. However, these components may be incorporated in the card 2. In addition, each embodiment includes two types of power supply keys, i.e., the first power supply key 14 and the second S power supply key 15. However, one power supply key may be a combination of the other power supply key and another arbitrary key. Alternatively, the power supply keys may be assigned to arbitrary keys by means of software.

As has been described above, according to the portable telephone set of the present invention, the following effects can be obtained.

1. In using the portable telephone set, the user needs to input the password when an individual information card is inserted in the portable telephone set. This mechanism provides excellent security against the loss and theft of the portable telephone set.

2. Since the individual information of the user, e.g., an identification number and a password, is not written in the portable telephone set but is written in an individual information card, the shop can easily and quickly complete the procedures for the new buyer.

3. When an individual information card is continuously used, the same telephone number can be used, thus solving the problem that the telephone number is changed when the user buys a new portable telephone set to replace the old one.

4. With the widespread use of portable telephone sets according to the present invention, even when the battery of a given telephone set goes dead, the user can borrow another telephone set of the same type and use it by inserting the individual information card therein.

What is claimed is:

1. A portable telephone set comprising:

a card having a first memory in which identification information and a password of a subscriber are stored in advance;

a portable telephone set body having at least radio means for transmitting/receiving a radio signal, and adapted to perform originating and terminating operations;

a card insertion detecting means for detecting insertion of said card in said portable telephone set body;

control means for setting said portable telephone set body in a password input wait state when insertion of said card is detected by said card insertion detecting means and a power supply of said portable telephone set is turned on while said card is inserted therein, and for setting said portable telephone set body in a wait state allowing said originating and terminating operations only when a correct password is input in the password input wait state; and power control means for turning on a power supply of said control means in accordance with a detection signal from said card insertion detecting means.

2. A telephone set according to claim 1, wherein said control means sets said portable telephone set body in the password input wait state when insertion of said card is detected by said card insertion detecting means, and sets said portable telephone set body in the wait state when the correct password is input in the password input wait state and when the power supply of said portable telephone set is turned on while said card is inserted in said portable telephone set body.

3. A telephone set according to claim 2, wherein said control means sets said portable telephone set body in the wait state when the power supply of said portable telephone set body is turned on while said card is inserted therein within a predetermined period of time after a last power-off operation, and sets said portable telephone set body in the password input wait state when the power supply of said portable telephone set body is turned on while said card is inserted therein after a lapse of not less than the predetermined period of time since a last power-off operation.

4. A telephone set according to claim 2, further comprising:
   a second memory mounted in said portable telephone set body and adapted to store the identification information and the password read out from said card; and
   a battery for supplying power to said memory, and
   wherein said control means sets said portable telephone set body in the wait state when the power supply of said portable telephone set body is turned on while power is left in said battery, and said card is inserted in said portable telephone set body, and
   sets said portable telephone set body in the password input wait state when the power supply of said portable telephone set body is turned on while no power is left in said battery, and said card is inserted in said portable telephone set body.

5. A telephone set according to claim 2, further comprising first and second power supply keys for independently controlling the power supply of said portable telephone set body, and
   wherein said control means sets said portable telephone set body in the password input wait state when the power supply of said portable telephone set body is turned on while said card is inserted therein after the power supply of said portable telephone set body is turned off by using said first power supply key, and
   sets said portable telephone set body in the wait state when the power supply of said portable telephone set body is turned on while said card is inserted therein after the power supply of said portable telephone set body is turned off by using said second power supply key.

6. A telephone set according to claim 5, wherein said control means sets said portable telephone set body in the wait state when the power supply of said portable telephone set body is turned on while said card is inserted therein within a predetermined period of time after the power supply is turned off by using said second power supply key, and
   sets said portable telephone set body in the password input wait state when the power supply of said portable telephone set body is turned on while said card is inserted therein after a lapse of not less than the predetermined period of time since the power supply is turned off by using said second power supply key.

7. A telephone set according to claim 1, further comprising a card slot which is formed in said portable telephone set to allow said card to be inserted therein, and
   wherein said card insertion detecting means detects insertion of said card into said card slot.

8. A telephone set according to claim 1, wherein said control means comprises:
   a central processing unit for executing a control program; and
   a second memory storing the control program executed by said central processing unit.

9. A portable telephone set according to claim 1 wherein said power control means turns off the power supply of said control means when the password input in the password input wait state is incorrect.

10. A portable telephone set according to claim 1 wherein said power control means turns off the power supply of said control means immediately when the password input in the password input wait state is incorrect.

11. A portable telephone set comprising:
   a card having a first memory in which identification information and a password of a subscriber are stored in advance;
   a portable telephone set body having at least radio means for transmitting/receiving a radio signal, and adapted to perform originating and terminating operations;
   a card insertion detecting means for detecting insertion of said card in said portable telephone set body; and
   control means for setting said portable telephone set body in a password input wait state when insertion of said card is detected by said card insertion detecting means and a power supply of said portable telephone set is turned on while said card is inserted therein, and for setting said portable telephone set body in a wait state allowing said originating and terminating operations only when a correct password is input in the password input wait state,
      wherein said control means sets said portable telephone set body in the password input wait state when insertion of said card is detected by said card insertion detecting means, and
      sets said portable telephone set body in the wait state when the correct password is input in the password input wait state and when the power supply of said portable telephone set is turned on while said card is inserted in said portable telephone set body, and
      wherein said control means sets said portable telephone set body in the wait state when the power supply of said portable telephone set body is turned on while said card is inserted therein within a predetermined period of time after a last power-off operation, and
      sets said portable telephone set body in the password input wait state when the power supply of said portable telephone set body is turned on while said card is inserted therein after a lapse of not less than the predetermined period of time since a last power-off operation.

12. A portable telephone set comprising:
   a card having a first memory in which identification information and a password of a subscriber are stored in advance;
   a portable telephone set body having at least radio means for transmitting/receiving a radio signal, and adapted to perform originating and terminating operations;
   a card insertion detecting means for detecting insertion of said card in said portable telephone set body; and
   control means for setting said portable telephone set body in a password input wait state when insertion of said card is detected by said card insertion detecting means and a power supply of said portable telephone set is turned on while said card is inserted therein, and for setting said portable telephone set body in a wait state allowing said originating and terminating operations only when a correct password is input in the password input wait state;
   a second memory mounted in said portable telephone set body and adapted to store the identification information and the password read out from said card; and
   a battery for supplying power to said memory,
      wherein said control means sets said second portable telephone set body in the password input wait state when insertion of said card is detected by said card insertion detecting means, and sets said portable telephone set body in the wait state when the correct password is input in the password input wait state and when the power supply of said portable telephone set is turned on while said card is inserted in said portable telephone set body, and wherein said control means sets said portable telephone set body in the wait state when the power supply of said portable telephone set body is turned on while power is left in said battery, and said card is inserted in said portable telephone set body, and sets said portable telephone set body in the password input wait state when the power supply of said portable telephone set body is turned on while no power is left in said battery, and said card is inserted in said portable telephone set body.

13. A portable telephone set comprising:

a card having a first memory in which identification information and a password of a subscriber are stored in advance;

a portable telephone set body having at least radio means for transmitting/receiving a radio signal, and adapted to perform originating and terminating operations;

a card insertion detecting means for detecting insertion of said card in said portable telephone set body;

control means for setting said portable telephone set body in a password input wait state when insertion of said card is detected by said card insertion detecting means and a power supply of said portable telephone set is turned on while said card is inserted therein, and for setting said portable telephone set body in a wait state allowing said originating and terminating operations only when a correct password is input in the password input wait state; and first and second power supply keys for independently controlling the power supply of said portable telephone set body, wherein said control means sets said portable telephone set body in the password input wait state when insertion of said card is detected by said card insertion detecting means, and sets said portable telephone set body in the wait state when the correct password is input in the password input wait state and when the power supply of said portable telephone set is turned on while said card is inserted in said portable telephone set body, and wherein said control means sets said portable telephone set body in the password input wait state when the power supply of said portable telephone set body is turned on while said card is inserted therein after the power supply of said portable telephone set body is turned off by using said first power supply key, and sets said portable telephone set body in the wait state when the power supply of said portable telephone set body is turned on while said card is inserted therein after the power supply of said portable telephone set body is turned off by using said second power supply key.

14. A telephone set according to claim 13, wherein said control means sets said portable telephone set body in the wait state when the power supply of said portable telephone set body is turned on while said card is inserted therein within a predetermined period of time after the power supply is turned off by using said second power supply key, and sets said portable telephone set body in the password input wait state when the power supply of said portable telephone set body is turned on while said card is inserted therein after a lapse of not less than the predetermined period of time since the power supply is turned off by using said second power supply key.

15. A portable telephone set comprising:

a card having a first memory in which identification information and a password of a subscriber are stored in advance;

a portable telephone set body having a transmitter/receiver of a radio signal, and being adapted to perform originating and terminating operations;

a card insertion detector which detects insertion of said card in said portable telephone set body;

a controller which sets said portable telephone set body in a password input wait state when insertion of said card is detected by said card insertion detector and a power supply of said portable telephone set is turned on while said card is inserted therein, and sets said portable telephone set body in a wait state allowing said originating and terminating operations only when a correct password is input in the password input wait state; and a power controller which turns on a power supply of said controller in accordance with a detection signal from said card insertion detector.

16. A portable telephone set comprising:

a card having a first memory in which identification information and a password of a subscriber are stored in advance;

a portable telephone set body having a transmitter/receiver of a radio signal, and being adapted to perform originating and terminating operations;

a card insertion detector which detects insertion of said card in said portable telephone set body; and controller which sets said portable telephone set body in a password input wait state when insertion of said card is detected by said card insertion detecting means and a power supply of said portable telephone set is turned on while said card is inserted therein, and sets said portable telephone set body in a wait state allowing said originating and terminating operations only when a correct password is input in the password input wait state, wherein said controller sets said portable telephone set body in the password input wait state when insertion of said card is detected by said card insertion detector, and sets said portable telephone set body in the wait state when the correct password is input in the password input wait state and when the power supply of said portable telephone set is turned on while said card is inserted in said portable telephone set body, and wherein said controller sets said portable telephone set body in the wait state when the power supply of said portable telephone set body is turned on while said card is inserted therein within a predetermined period of time after a last power-off operation, and sets said portable telephone set body in the password input wait state when the power supply of said portable telephone set body is turned on while said card is inserted therein after a lapse of not less than the predetermined period of time since a last power-off operation.

17. A portable telephone set comprising:

a card having a first memory in which identification information and a password of a subscriber are stored in advance;

a portable telephone set body having a transmitter/receiver of a radio signal, and being adapted to perform originating and terminating operations;

a card insertion detector which detects insertion of said card in said portable telephone set body; and controller which sets said portable telephone set body in a password input wait state when insertion of said card is detected by said card insertion detector and a power supply of said portable telephone set is turned on while said card is inserted therein, and for setting said portable telephone set body in a wait state allowing said originating and terminating operations only when a correct password is input in the password input wait state;

a second memory mounted in said portable telephone set body and adapted to store the identification information and the password read out from said card; and a battery for supplying power to said second memory,
wherein said controller sets said portable telephone set body in the password input wait state when insertion of said card is detected by said card insertion detector, and sets said portable telephone set body in the wait state when the correct password is input in the password input wait state and when the power supply of said portable telephone set is turned on while said card is inserted in said portable telephone set body, and wherein said controller sets said portable telephone set body in the wait state when the power supply of said portable telephone set body is turned on while power is left in said battery, and said card is inserted in said portable telephone set body, and sets said portable telephone set body in the password input wait state when the power supply of said portable telephone set body is turned on while no power is left in said battery, and said card is inserted in said portable telephone set body.

18. A portable telephone set comprising:

a card having a first memory in which identification information and a password of a subscriber are stored in advance;

a portable telephone set body having a transmitter/receiver of a radio signal, and being adapted to perform originating and terminating operations;

a card insertion detector which detects insertion of said card in said portable telephone set body;

controller which sets said portable telephone set body in a password input wait state when insertion of said card is detected by said card insertion detecting means and a power supply of said portable telephone set is turned on while said card is inserted therein, and sets said portable telephone set body in a wait state allowing said originating and terminating operations only when a correct password is input in the password input wait state; and first and second power supply keys for independently controlling the power supply of said portable telephone set body, wherein said controller sets said portable telephone set body in the password input wait state when insertion of said card is detected by said card insertion detector, and sets said portable telephone set body in the wait state when the correct password is input in the password input wait state and when the power supply of said portable telephone set is turned on while said card is inserted in said portable telephone set body, and wherein said controller sets said portable telephone set body in the password input wait state when the power supply of said portable telephone set body is turned on while said card is inserted therein after the power supply of said portable telephone set body is turned off by using said first power supply key, and sets said portable telephone set body in the wait state when the power supply of said portable telephone set body is turned on while said card is inserted therein after the power supply of said portable telephone set body is turned off by using said second power supply key.

* * * * *